United States Patent
Shie et al.

(10) Patent No.: US 6,483,976 B2
(45) Date of Patent: Nov. 19, 2002

(54) OPTICAL ELEMENT HAVING AN INTEGRAL SURFACE DIFFUSER

(75) Inventors: Rick L. Shie, Westlake Village, CA (US); Jeffrey A. Laine, Redondo Beach, CA (US); Gajendra D. Savant, Torrance, CA (US); Tomasz P. Jannson, Torrance, CA (US)

(73) Assignee: Physical Optics Corporation, Torrance, CA (US)

(*) Notice: Subject to any disclaimer, the term of this patent is extended or adjusted under 35 U.S.C. 154(b) by 0 days.

(21) Appl. No.: 09/851,815

(22) Filed: May 9, 2001

(65) Prior Publication Data

US 2001/0017970 A1 Aug. 30, 2001

Related U.S. Application Data

(62) Division of application No. 09/139,488, filed on Aug. 25, 1998, now Pat. No. 6,266,476.

(51) Int. Cl.[7] .................................................. G02B 6/00
(52) U.S. Cl. ........................ 385/133; 385/146; 359/566
(58) Field of Search ................................. 385/146–147, 385/133, 141; 359/443, 566, 707, 742

(56) References Cited

U.S. PATENT DOCUMENTS

| | | | | |
|---|---|---|---|---|
| 5,339,179 A | * | 8/1994 | Rudisill et al. | 359/49 |
| 5,854,872 A | * | 12/1998 | Tai | 385/133 |
| 6,266,476 B1 | * | 7/2001 | Shie et al. | 385/147 |

\* cited by examiner

*Primary Examiner*—Ellen E. Kim
(74) *Attorney, Agent, or Firm*—Nilles & Nilles; Leonard Tachner

(57) ABSTRACT

A monolithic element has a substrate body and at least one macro-optical characteristic integral in a first portion of the optical element. A plurality of surface micro-structures are integral in a portion of the optical element. The micro-structures are designed to homogenize light passing through the optical element to produce a predetermined pattern of smoothly varying, non-discontinuous light exiting the optical element. The light exiting the optical element is therefore altered according to both the macro-optical characteristic of the optical element as well as the homogenizing characteristics of the micro-structures.

15 Claims, 3 Drawing Sheets

OPTICAL ELEMENT HAVING AN INTEGRAL SURFACE DIFFUSER

The present application is a divisional application of U.S. patent application Ser. No. 09/139,488, filed Aug. 25, 1998, now patented with U.S. Pat. No. 6,266,476.

BACKGROUND OF THE INVENTION

1. Field of the Invention

The present invention relates generally to the field of optics, and more particularly to various optical elements incorporating an integral surface diffuser as a portion of the optical element.

2. Description of the Related Art

There are many types of optical elements useful for an endless number of current and new applications. These optical elements are placed in a beam or path of light to change the characteristics of the light passing through the optical elements. Such optical elements may be as simple as a conventional cylindrical lens where a beam of light entering the lens remains unaffected in its width and is spread by the cylindrical lens contour in a direction perpendicular to its width. An example of another optical element is a transparent medium having a flat surface on one side and a concave or convex surface on the other side which changes the characteristics of light passing through the lens. Such lenses are commonly used for eyeglasses, magnifying glasses, film projectors and similar objects.

Other types of optical elements are known and may include Fresnel structures, grating structures, filters, Total internal reflection (TIR) structures, nonlinear optical elements such as GRIN lenses, prismatic structures, polarizers, pillow optic formations, fiber optic cables and other types of optical wave guides. All of these structures receive a light input from a light source and transmit or reflect the light through the structure or element and then permit the light to exit from the structure or element in a somewhat altered state. All of these types of optical elements either transmit, reflect, diffract, refract, or filter out certain wavelengths of the light as it exits the structure or element.

Each of these optical elements receives light from a light source having particular characteristics defined by the properties of the light source and then alter the light propagating through the optical element. However, none of these optical elements is capable of improving the optical qualities of the light in a manner which evens or smoothes out the light by eliminating high-intensity spots and low-intensity spots within the source. By evenly diffusing the light traveling in or through the optical element the output is made smooth and non-discontinuous. Additionally, none of these types of optical elements is capable of substantially reducing or eliminating scatter of light and directing substantially all or most of the light photons in a particular desired direction, pattern, or envelope. Virtually all of these known optical elements merely perform a particular optical function as light passes through or reflects off of the element.

For example, a fiber optic cable is designed to take in light energy at one end and via the predetermined refractive index of the fiber materials (core and cladding) continually and internally reflects the light as it passes through the fiber so that essentially all the light exits the fiber optic cable in substantially the same form in which it was received (ignoring modal variations). Convex lenses used in such objects as eyeglasses and projector lenses (which use multiple lenses) slightly bend the light as it enters one side of the lens according to the amount of curvature or shape of the lens or lenses and the materials utilized to manufacture the lens. A Fresnel lens includes a plurality of Fresnel structures provided on a surface of the lens which bend or refract the light in order to collimate or focus light passing through the lens. Many other optical elements are available which perform a particular optical function on light. These optical elements are not capable of smoothing out or "homogenizing" the light intensity variations exiting the optical element or directing substantially all of the light in a particular direction and in a particular shape, envelope, or pattern. Consequently, in prior art optical elements, a significant amount of light is lost or wasted.

Diffusers have been applied as a separate layer to optical elements in order to add both light diffusing and directing characteristics. In such a construction, a laminate is formed including a sheet or a layer of diffuser material applied or adhered to a surface of an optical element, such as for example, a Fresnel lens. One problem with such a construction is that the sheet material is not very durable and is easily damaged, scratched or otherwise deformed during use. Another problem is that the diffuser sheet metal may simply peel away from the optical element over time or under certain conditions. Another even more critical problem with such a laminate construction is that the mating surfaces between the two portions of the laminate create an interface which refracts or reflects a portion of light entering the optical element. This Fresnel reflection causes a minimum loss of 4% of the incident light at each mating surface which therefore does not pass through the diffuser and optical element or is otherwise altered in an undesirable manner. A further problem with such a construction is that an index matching optical grade epoxy or adhesive must be used in order to adhere the two parts of the laminate together. The optical grade epoxy permits passage of light through itself but creates an additional layer or refractive surface at each contact point, and hence additional Fresnel losses, both between the diffuser layer and the epoxy and between the optical element and the epoxy. The epoxy layer also adds cost to the laminate construction as well as manufacturing complexity. Another problem with the epoxy is that there may be instances where the epoxy is not in complete contact with one surface of the laminate or has air bubbles between the epoxy and one of the laminate layers or within the epoxy itself. Such irregularities cause further problems (i.e., scattering) with light passing within the laminate optical element. All the above problems greatly reduce the performance and desirability of laminated optical elements.

The assignee of the present invention has invented several ways of forming a plurality of surface micro-structures in various materials to form a surface diffuser on such materials. These methods are described in a number of issued patents and co-pending patent applications listed below. Many of these methods involve creating a master diffuser by exposing a photoresist material to a source of light and then replicating this master diffuser into one or more submasters of a more durable nature. There are also other methods of making replicas of a master diffuser which contain the optical features in the master. With some of these methods, the master diffuser is initially created optically. With others, it is created mechanically. Submasters are created from these master diffusers utilizing a number of methods whereby the master diffuser surface is replicated into a submaster surface. These other methods are described in one or more pending U.S. applications, referenced below, which are assigned to the assignee of the present invention.

Other commonly assigned U.S. patents and pending applications disclose related methods for making and recording optical products and replicating those products so that they may be mass produced. For example, U.S. Pat. No. 5,365,354 entitled "Grin Type Diffuser Based on Volume Holographic Material," U.S. Pat. No. 5,534,386 entitled "Homogenizer Formed Using Coherent Light and a Holographic Diffuser," and U.S. Pat. No. 5,609,939 entitled "Viewing Screen Formed Using Coherent Light," all owned by the present assignee relate to methods for recording and replicating optical products. Each of these U.S. patents is incorporated herein by reference for purposes including, but not limited to, indicating the background of the present invention and illustrating the state of the art.

Related U.S. patent applications include Ser. No. 08/782,962 entitled "Apparatus for LCD Backlighting," now U.S. Pat. No. 6,072,551, Ser. No. 09/052,586 entitled "Method of Making Replicas While Preserving Master," now U.S. Pat. No. 6,159,398, Ser. No. 08/595,307 entitled "LCD With Light Source Destructuring and Shaping Device," now U.S. Pat. No. 5,956,106 Ser. No. 08/601,133 entitled "Liquid Crystal Display System with Collimated Backlighting and Non-Lambertian Diffusing," now U.S. Pat. No. 5,838,403, Ser. No. 08/618,539 entitled "Method of Making Liquid Crystal Display System," now U.S. Pat. No. 5,735,988, Ser. No. 08/800,872 entitled "Method of Making Replicas and Compositions for Use Therewith," now U.S. Pat. No. 5,922,238, and Ser. No. 09/075,023 entitled "Method and Apparatus for Making Optical Masters Using Incoherent Light," "Non-Lambertian Glass Diffuser and Method of Making," filed Aug. 20, 1998, "Diffuser Master and Method of Manufacture," filed Aug. 20, 1998, "High Efficiency Monolithic Glass Light Shaping Diffuser and Method of Making," filed Aug. 25, 1998, "Vehicle Light Assembly Including a Diffuser Surface Structure," filed Aug. 25, 1998, "Apparatus Having a Light Source and a Sol-Gel Monolithic Diffuser," filed Aug. 25, 1998, "Passive Matrix Liquid Crystal Display," filed Aug. 25, 1998, and "Device Including an Optical Element With a Diffuser," filed Aug. 25, 1998. All the above applications are owned by the present assignee and are hereby incorporated by reference for purposes including, but not limited to, indicating the background of the present invention and illustrating the state of the art.

SUMMARY OF THE INVENTION

A monolithic optical element constructed in accordance with the present invention has a substrate body with at least one macro-optical characteristic integral in a first portion of the optical element. The monolithic optical element also includes a plurality of surface micro-structures integral in a portion of the optical element wherein the micro-structures homogenize light passing through the optical element to produce a predetermined pattern of smoothly varying, non-discontinuous light which exits the optical element.

It is an object of the present invention to provide an optical element which both has at least one macro-optical characteristic as well as a light diffusing and shaping surface structure provided by the surface micro-surface structures integral in a portion of the optical element. It is a further object of the present invention to provide such a monolithic optical element which is formed of one single body of material and is not a laminate construction. It is a further object of the present invention to provide a monolithic optical element which eliminates the lossy reflective abutting surface between two components of a laminate which would otherwise create unwanted Fresnel reflection losses of 4% at each surface, and thus which substantially increases transmission efficiency over the prior art. It is a still further object of the present invention to provide a monolithic optical element wherein the surface micro-structures of the diffuser surface are formed integral from the same material as the remainder of the optical element to provide a more durable and substantially more useful element and one which is less expensive to manufacture.

In one embodiment, the substrate body of the optical element is a Fresnel lens wherein the at least one macro-optical characteristic is a plurality of Fresnel optics. In another embodiment, the substrate body is an elongate fiber optic cable or optical waveguide and the at least one macro-optical characteristic is a refractive index or indices of the cable. In other embodiments of the invention, the monolithic optical element is any type of optical lens such as a concave or convex lens, an aspheric lens, a polarizer, a prismatic structure, a filter, a grating structure, or a total internal reflection lens wedge ("light pipe"), or retroreflector. In yet another embodiment the monolithic optical element is a lightpipe such as for use in a laptop computer display. In any of these embodiments, the particular lens characteristic or structure is formed integral as a portion of the substrate body and the micro-structures which provide the diffusing and light shaping characteristics are also formed integral in a portion of the substrate body. In one embodiment, the micro-structures are formed integral in a portion of the substrate body separate from the macro-optical characteristic. In an alternative embodiment, the micro-structures are formed integral in the same surface of the optical element as the macro-optical characteristic.

These and other aspects and objects of the present invention will be better appreciated and understood when considered in conjunction with the following description and accompanying drawings. It should be understood, however, that the following description, while indicating preferred embodiments of the present invention as given by way of illustration and not of limitation. Many changes and modifications may be made within the scope of the present invention without departing from the spirit thereof and the invention includes all such modifications.

BRIEF DESCRIPTION OF THE DRAWINGS

A clear conception of the advantages and features of the present invention, and of the construction and operation of the typical mechanisms provided with the present invention, will become more readily apparent by referring to the exemplary and therefore nonlimiting embodiments illustrated in the drawings accompanying informing a part of this specification, and in which:

FIG. 1b illustrates a cross-sectional view taken along line 1b—1b of the Fresnel lens of FIG. 1a;

FIG. 2b illustrates a cross-sectional view of the cylindrical lens taken along line 2b—2b of FIG. 2a;

FIG. 3b illustrates a cross-sectional view taken along line 3b—3b of the convex lens of FIG. 3a;

FIG. 4b illustrates a cross-sectional view taken along line 4b—4b of the fiber optic cable of FIG. 4a;

FIG. 5b illustrates a cross-sectional view taken along line 5b—5b of the prismatic optical element of FIG. 5a;

FIG. 6b illustrates a cross-sectional view taken along line 6b—6b of the polarizer optical element of FIG. 6a;

FIG. 7b illustrates a cross-sectional view of the wave guide filter grating taken along line 7b—7b of FIG. 7a;

FIG. 8b illustrates a cross-sectional view taken along line 8b—8b of the concave lens of FIG. 8a;

DETAILED DESCRIPTION OF THE PREFERRED EMBODIMENTS

According to the above listed patents and co-pending patent applications assigned to the assignee of the present invention, methods have been developed by the assignee for optically or mechanically creating micro-sculpted surface structures or micro-structures in a substrate which are random in nature and produce a light output with a smooth consistent and continuous intensity. These micro-structures can also be created in such a manner so as to control the direction of light output from a light source so as to shape the light output into a desired distribution pattern or envelope. The issued patents are directed to forming these surface structures by various means in photoresist materials and replicating theses structures in sub-masters. These sub-masters are utilized to further replicate the micro-structures in sheets of material which may be laminated or otherwise applied to objects in order to provide the light homogenizing, shaping and directing characteristics. The co-pending applications disclose the further developed techniques for novelly forming these micro-structures in materials other than in epoxy and sheets of soft plastic.

The present invention is not to be limited to forming these micro-structures in any particular material and therefore the optical elements described herein may be formed from such materials as sol-gel glass, quartz glass, polycarbonate and acrylic plastics, epoxies, and any other suitable plastic, glass or other moldable materials. The present invention is directed to optical elements having integrally formed micro-structures to produce a monolithic structure having both the macro-optical characteristic associated with a particular optical element as well as the diffuser micro-structures to improve the characteristics of the light propagating therethrough, to minimize unwanted Fresnel reflection losses and thereby actually increase transmission efficiency, and to decrease cost of manufacture.

Figure 1A:
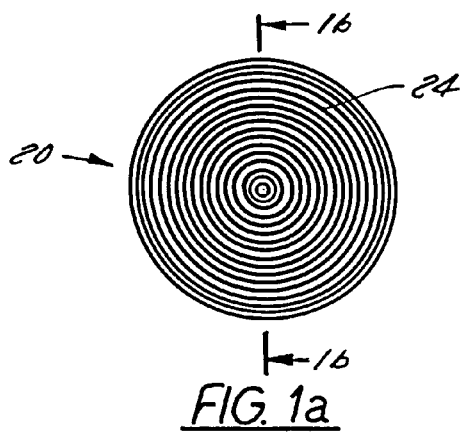
FIG. 1a illustrates an elevational perspective view of a Fresnel lens optical element.
Figure 1B:
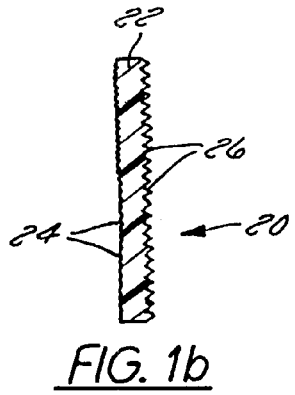

Referring now to the drawings, the figures illustrate a number of possible embodiments of particular optical elements which incorporate the micro-structure integrally into the optical element to form a monolithic structure with improved and defined light propagation characteristics. The embodiments shown are not intended to exhaust the list of possible optical elements but merely to illustrate some of the possibilities. FIGS. 1a and 1b illustrate an optical element in the form of a Fresnel lens 20. A Fresnel lens is typically utilized in many applications for taking light from a light source and spreading, collimating, or focusing the light according to the structural characteristics of the Fresnel lens. For example, a Fresnel lens is typically utilized in many automotive applications for objects as simple as interior dome lights, simple trailer lights and in various vehicle taillamp construction.

A Fresnel lens 20 constructed in accordance with the present invention includes a substrate body 22 which may be formed of any number of materials but in many applications is molded from a plastic material. Additionally, the substrate body 22 may be formed in any number of shapes, configurations and contours without departing from the scope of the present invention although the lens 20 is simply shown as a planar structure. A conventional Fresnel lens 20 has on one surface thereof a plurality of Fresnel optics 24. These structures are typically in the form of a plurality of circular or oval shaped continuous or discontinuous ridges disposed radially outward from a center axis relative to one another on the surface of the substrate body 22. The particular size, cross-sectional shape and contour of the Fresnel optics as well as the size, curvature, and frequency of the continuous rings determine the macro-optical characteristic of a particular Fresnel lens 20. The Fresnel lens 20 constructed in accordance with the invention however also includes a plurality of surface micro-structures 26 molded into the opposite side of the substrate body 22 according to one of the several methods disclosed in the above noted pending applications. These micro-structures can be molded or embossed directly into this substrate body 22 during formation of the Fresnel lens 20 from a master substrate. The master substrate can be formed from a multi-step optical recording process or form one of several novel mechanical means such as brushing, etching or shot blasting of the substrate as described in one or more of the above incorporated patents and patent applications. The result is a monolithic body 22 including both the macro-optical characteristic Fresnel optics 24 on one surface and the micro-structures 26 on another surface of the body.

Figure 2A:
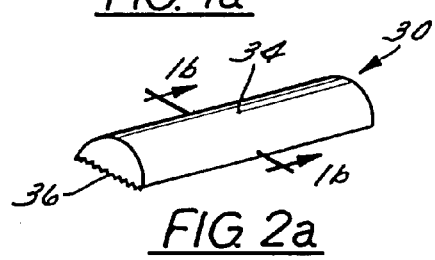
FIG. 2a illustrates an elevational perspective view of a cylindrical lens optical element.
Figure 2B:
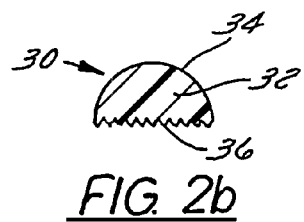
Figure 2C:
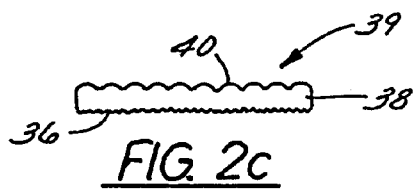
FIGS. 2c and 2d illustrate a cross-sectional view of alternative cylindrical lens optical elements.
Figure 2D:
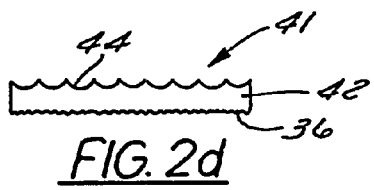

FIGS. 2a and 2b illustrate an optical element in the form of a cylindrical lens 30. The cylindrical lens 30 has a substrate body 32 which on one side includes an elongate cylindrical surface 34 defining the macro-optical characteristic of the lens. The opposite side of the substrate body 32 includes a plurality of the micro-structures 36 which define the diffuser surface formed by the several methods disclosed in the above noted co-pending United States patent and patent applications. FIGS. 2c and 2d illustrate alternative embodiments of cylindrical lens structures 37 and 41. FIG. 2c illustrates a substrate body 38 having thereon a plurality of cylindrical lenses 40 on one side and a plurality of the micro-structures 36 formed on the other side of the substrate 38. FIG. 2d illustrates an alternative substrate body 42 having thereon a plurality of inverted or reverse cylindrical lenses 44 formed thereon. The micro-structures 36 are formed on the opposite side of the substrate 42.

In each of the embodiments of FIGS. 2a–2d, the curvature and contour of the cylindrical lens surfaces 34, 40 and 44 define the macro-optical characteristic of the lens 30 or alternative lenses 37 and 41. The micro-structures 36 provide the novel diffusing characteristics and are again molded or formed integral into a surface of the substrate bodies 32, 38 and 42 along with the micro-optical characteristics for each particular embodiment. Therefore, each of the lenses 30, 37 or 41 are again monolithic structures. Importantly, the monolithic nature of the optical elements yields the highly desirable light diffusing and shaping advantages without the attendant Fresnel losses in prior art laminated structures. In fact, the monolithic optical elements of the present invention actually and unexpectedly increase light transmission.

Figure 3A:
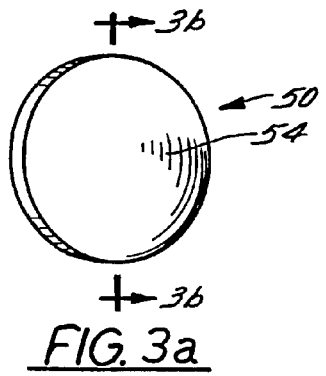
FIG. 3a illustrates an elevational perspective view of a parabolic convex lens optical elements.
Figure 3B:
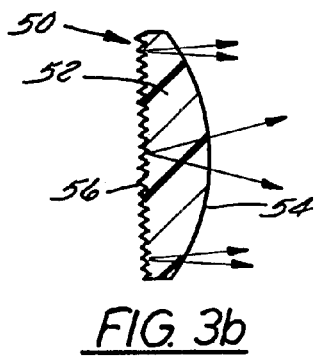

FIGS. 3a and 3b illustrate an optical element in the form of a parabolic convex lens 50. The lens 50 includes a substrate body 52 having on one side a curved or parabolic convex lens surface 54 and the plurality of micro-structures 56 formed on the opposite side of the substrate body 52. The parabolic convex lens surface 54 produces the macro-optical characteristic of the lens 50 and the micro-structures 56 provide the diffusing characteristics according to the present invention. Again, transmission efficiency is actually increased over laminated structures because the lens 50 is formed as a monolithic structure wherein the parabolic convex surface 54 and the micro-structures 56 are formed integral as a part of the substrate body material.

Microstructures 56 may also be made nonuniform across the lens 50 to minimize certain lens aberrations. For example, as indicated by the arrows in FIG. 3 the microstructures 56 at the outer edges of the lens may be designed to shape the light into a narrow distribution while the microstructures 56 in the middle may provide a broader light distribution pattern.

Figure 4A:
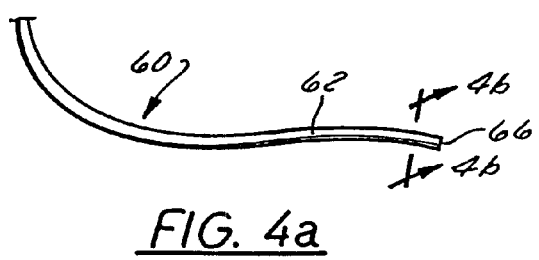
FIG. 4a illustrates an elevational perspective view of a fiber optic cable optical element.
Figure 4B:
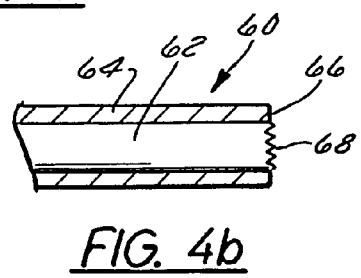

FIGS. 4a and 4b illustrate an optical element in the form of a fiber optic cable 60 in an enlarged form. The cable 60 includes a longitudinal substrate body 62, a core 62 and an external cladding 64 surrounding the core. The fiber optic element or cable 60 also has a distal end 66 at which the cable terminates. The refractive index of the fiber optic cable partially defines the macro-optical light propagating characteristics of the cable.

In this embodiment, the plurality of micro-structures 68 are integrally formed on the end 66 of the cable 60 during formation of the cable. For example, during conventional manufacturing of a fiber optic cable, the cable substrate 62 is formed in continuous lengths which are eventually cut to size. Once cut, the end may already be heated or can then be heated after separation from the continuous cable whereby the micro-structures 68 are then molded, embossed, or otherwise replicated in the end of the fiber optic cable 60. In this embodiment, the end of the fiber optic cable may be heated by any suitable means as long as the materials of the core 62 and cladding 64 are elevated to a sufficient temperature in order that the micro-structures 68 are replicated into the material of the core 62. A monolithic structure is thus formed including the micro-structures 68 and the core 62.

Figure 5A:
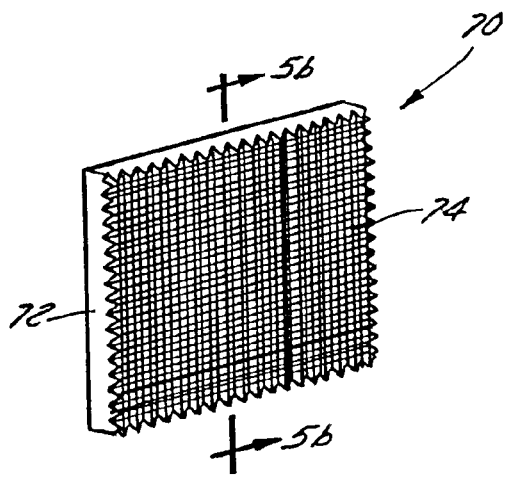
FIG. 5a illustrates an elevational perspective view of a prismatic optical element.
Figure 5B:
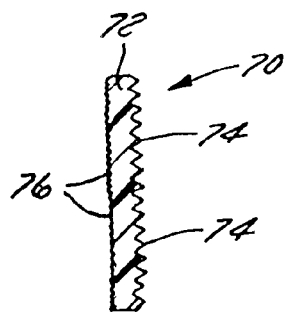

FIGS. 5a and 5b illustrate an optical element in the form of a prismatic structure 70. The structure 70 includes a substrate body 72 and a plurality of prism structures 74 on one side. The prism structures 74 may be in any configuration or construction including individual prismatic structures, a plurality of prism arrays, or merely a plurality of elongate prism structures formed on the substrate 72. A plurality of the micro-structures 76 are formed on the opposite side of the substrate 72. The substrate body 72, the macro-optical prism structures 74 and the diffuser microstructures 76 are all formed integral in the monolithic prismatic structure 70.

Figure 6A:
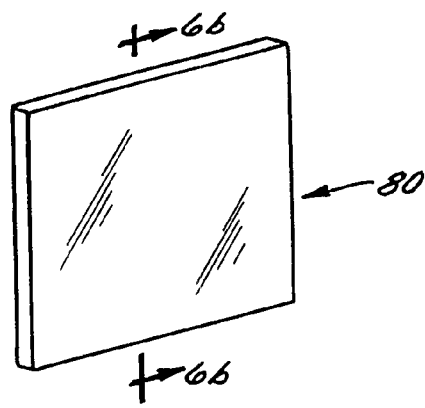
FIG. 6a illustrates an elevational perspective view of a polarizer optical element.
Figure 6B:
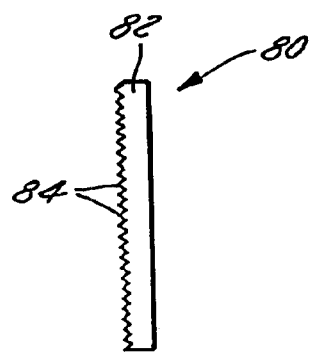

FIGS. 6a and 6b illustrate an optical element in the form of a polarizer 80 wherein the macro-optical characteristic is the filtering or polarizing property of the element and whereby the polarizers are embedded in a substrate body 82. The substrate body 82 has the micro-structures 84 on one surface of the substrate. The opposite surface of the substrate is essentially flat in this embodiment because the polarizing capability of the substrate 82 is within the monolithic body itself. The optical element in the form of a polarizer 80 has formed in one surface a plurality of light diffusing or homogenizing micro-structures which provide the enhanced transmission and diffusing capabilities of the element.

Figure 7A:
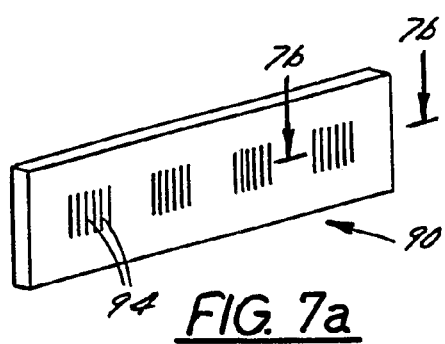
FIG. 7a illustrates a wave guide filter grating optical element.
Figure 7B:
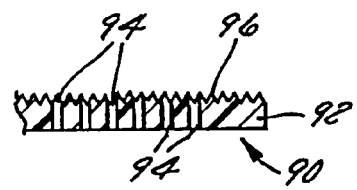

FIGS. 7a and 7b illustrate an optical element in the form of an optical filter grating structure 90. The grating structure 90 includes a substrate body 92 and plurality of gratings 94 formed therein by one of many known means. The grating structures are spaced apart periodic lines formed in the substrate material 92 which filter out certain wavelengths from the light source as it passes through or reflects off of the structure 90. A plurality of the micro-structures 96 are formed into a surface of the grating structure 90 in the substrate body 92 during manufacture of the grating structure. The optical element is a monolithic construction wherein the macro-optical gratings 94 and the microstructures 96 are integral in the material of the substrate body 92.

Figure 8A:
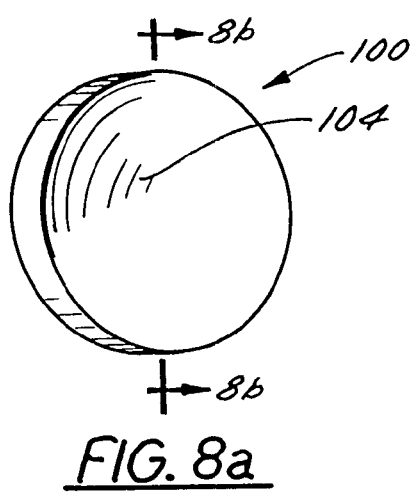
FIG. 8a illustrates an elevational perspective view of a parabolic concave lens optical element.
Figure 8B:
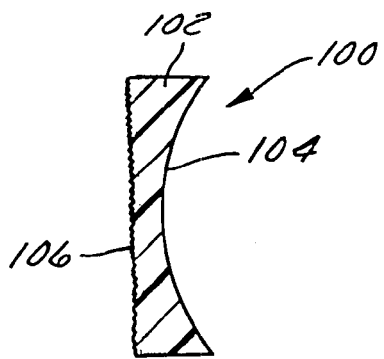

FIGS. 8a and 8b illustrate an optical element in the form of a concave lens 100. The concave lens 100 includes a substrate body 102 having a concave surface 104 on one side and the plurality of micro-structures 106 carried on the other side of the substrate. The curvature of the surface 104 and the refractive index defines the macro-optical characteristic of the lens 100 and the micro-structures 106 provide the diffusing or homogenizing characteristics of the lens 100. The curved surface 104 and the structures 106 are each integral into opposite sides of the materials of the substrate body 102.

Figure 9:
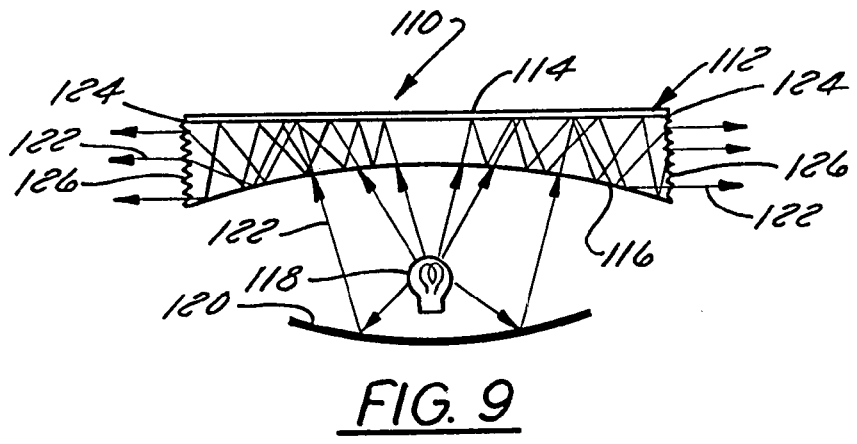
FIG. 9 illustrates a simple schematic view of total internal reflection optical element.

FIG. 9 illustrates a simple schematic view of another type of optical element in the form of a total internal reflection or TIR lens assembly 110. The lens assembly 110 includes a TIR lens 112 which has on one side a reflector surface 114 for reflecting light entering the lens 112 back toward the direction from which it came at a predetermined angle. In this embodiment, the TIR lens 112 also includes a curved entrance surface 116 which permits light to pass initially therethrough into the lens but then reflects light back toward the interior of the lens once the light is inside of the lens itself as illustrated in FIG. 9. The curvature of the surface 116 is determined by the angle of light entering the lens 112 and the characteristics of the material from which the lens 112 is made as well as the reflector surface 114. A light source 118 is placed adjacent the lens 112 to direct light toward and into the lens.

In the embodiment illustrated in FIG. 9, the light source is a standard filament type incandescent light bulb which projects light in generally all directions and therefore requires a back reflector 120 for reflecting some of the light back towards the lens 112 as illustrated in FIG. 9. The travel path of the light is indicated by the lines 122. A portion of the lens 112 is intended to permit the light to exit from the interior of the lens. In the present exemplary embodiment, light exits the opposed ends 124 of the lens 112. The microstructures 126 are formed on the surfaces 124 where the light exits the TIR lens 112 and is thus diffused and directed according to the design characteristics of the microstructures 126. Such a TIR lens may take on any number of configurations and constructions and is utilized in many different applications. Thus, the exit surfaces of the lens may vary greatly from the simple schematic illustrated in FIG. 9. However, the diffuser micro-structures 126 are formed integral with the material of the TIR lens 112 on each intended exit surface as desired.

Such a TIR lens assembly 110 is found in many types of applications. These may include automotive lighting systems including taillight assemblies, global positioning systems(GPS) backlighting units, telephone display backlighting systems, pagers, watches, map lights, street lights, traffic signals, special effect and architectural lighting, light pipes, and many other applications where the light source is a LED, laser, a fiber or waveguide, or filament type lighting. In each of these applications it is critical to maximize light at by minimizing Fresnel and other reflection losses. By maximizing transmission of light through the optical element in these devices, smaller sources may be used and enhanced device performance is realized.

Figure 10A:
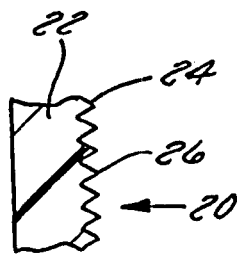
FIGS. 10a and 10b illustrate a cross-sectional view of alternative embodiments of an optical element of the invention.
Figure 10B:
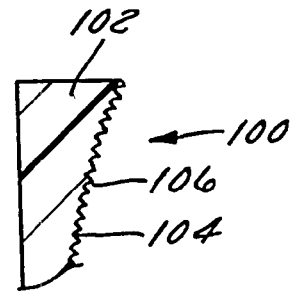

FIGS. 10a and 10b illustrate represent alternatives which are also intended to be in the scope of the present invention. FIG. 10a illustrates a blown up view of a portion of the Fresnel optics 24 illustrated for the Fresnel lens 20. Instead of the micro-structures 26 being formed on an opposite side of the lens 20, the micro-structures 26 may be formed directly on the surface of the Fresnel optics 24 themselves as illustrated in FIG. 10a. Similarly FIG. 10b illustrates a portion of the concave parabolic lens 100 wherein the micro-structures 106 are formed directly on the same surface that carries the curved macro-optical concave surface 104. It will be apparent by these exemplary illustrations that in many of the above described embodiments, the micro-structures which form the homogenizing and/or light directing micro-optical characteristics may be provided on the same surface which carries the macro-optical characteristics of the optical element. In some applications, such a construction may not be possible because of the type of macro-optical characteristic such as, for example, the fiber optic cable 60.

Figure 11:
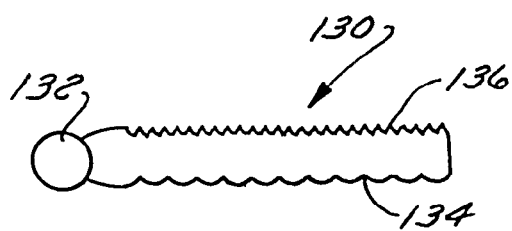
FIG. 11 illustrates a light pipe alternative embodiment according to the invention.

FIG. 11 represents another alternative within the scope of the present invention. FIG. 11 illustrates a lightpipe 130 having a CCFL light source 132. Lightpipe 130 has integral on the lower surface thereof groove or facet structures 134 which may be TIR or partially mirrored. Integral in the top surface of lightpipe 130 are micro-structures 136 which homogenize, shape, and direct light exiting the lightpipe 130 toward the user such a lightpipe may be used in devices such as laptop computers or other electronic devices.

As described in many of the above referenced issued patents and co-pending patent applications, the micro-surface structures may be formed in the surface of many different materials which are capable of being used for optical applications. Therefore, the present invention is not to be limited to producing the main substrate body of any particular optical element from a particular material. The optical elements may take on any number of configurations and constructions, each having one or more particular macro-optical characteristics. The materials from which these optical elements are made thus may also vary considerably.

Though the invention has been described referring to particular embodiments, many other changes and modifications may be made to the invention as described without departing from the spirit and scope thereof. The scope and spirit of these changes will become apparent from the appended claims. The scope of the invention is therefore intended only to be limited by the appended claims.

What is claimed is:

1. A monolithic optical element through which light is able to pass, comprising:

a substrate body through which light is able to pass;

a macro-optical characteristic integral with the substrate body; and a plurality of micro-structures through which light is able to pass and which are random in nature and which are integral with the substrate body, wherein the micro-structures are characterized as being able to homogenize light exiting the monolithic optical element via the substrate body, wherein the micro-structures are further characterized as being able to direct a predetermined distribution of light exiting the monolithic optical element via the substrate body in a manner so as to shape substantially all of a light output of the monolithic optical element into a predetermined direction and distribution pattern, wherein the substrate body, the macro-optical characteristic integral therewith and the plurality of random micro-structures also integral therewith cooperate thereby to enable the monolithic optical element to produce the light output providing the predetermined direction and distribution pattern of smoothly varying, non-discontinuous light exiting the monolithic optical element, wherein the substrate body is a total internal reflection lens assembly and wherein the macro-optical characteristic is a total internal reflection capability of the total internal reflection lens assembly, and wherein the total internal reflection lens assembly includes opposed end surface portions, the opposed end surface portions including the micro-structures from where the light within the total internal reflection lens assembly exits the total internal reflection lens assembly.

2. The optical element according to claim 1, wherein the substrate body is a plastic material and wherein the macro-optical characteristic and the micro-structures are each characterized as having been molded integral with the plastic material.

3. The optical element according to claim 1, wherein the substrate body is a hardened sol-gel solution and wherein the macro-optical characteristic and the micro-structures are each characterized as having been formed integral with the hardened sol-gel solution.

4. The optical element according to claim 1, wherein the substrate body and the macro-optical characteristic integral therewith are of a glass material and wherein the micro-structures are characterized as having been formed integral with the macro-optical characteristic.

5. A total internal reflection lens assembly through which light is able to pass, comprising:

a total internal reflection lens having an entrance surface that is adapted to:
  (i) permit light initially to pass through said entrance surface into the lens, and
  (ii) reflect light away from the entrance surface as soon as the light is inside of the lens, wherein the total internal reflection lens is elongated and has opposite end surface portions from where the light within the total internal reflection lens exits the lens;

a light-reflective surface that is integral with the total internal reflection lens and that is spaced from and disposed toward the entrance surface for reflecting the light entering the lens back toward the entrance surface at a predetermined angle; and a plurality of micro-structures through which light is able to pass and which are random in nature and which are integral with the opposite end surface portions of the total internal reflection lens, wherein the micro-structures are characterized as being not only able to homogenize light exiting the total internal reflection lens via the opposite end surface portions but also able to diffuse and shape the light, wherein the micro-structures are further characterized as being able to direct a predetermined distribution of light exiting the total internal reflection lens via the opposite end surface portions in such a manner as to shape substantially all of a light output of the total internal reflection lens into a predetermined direction and distribution pattern, and wherein the entrance surface, the light-reflective surface, the lens end portions and the plurality of random micro-structures integral therewith cooperate thereby to enable the total internal reflection lens to produce the light output having the predetermined direction and distribution pattern of smoothly varying, non-discontinuous light exiting the total internal reflection lens assembly.

6. The total internal reflection lens assembly according to claim 5, further comprising a light source disposed adjacent the entrance surface for directing light toward and into the total internet reflection lens.

7. The total internal reflection lens assembly according to claim 5, herein the entrance surface is a curved entrance surface.

8. The total internal reflection lens assembly according to claim 5, wherein the assembly is substantially a plastic material and wherein the micro-structures are characterized as having been molded integral with the plastic material.

9. The total internal reflection lens assembly according to claim 5, wherein the assembly is substantially a hardened sol-gel solution and wherein the micro-structures are each characterized as having been formed integral with the hardened sol-gel solution.

10. The total internal reflection lens assembly according to claim 5, wherein the assembly is substantially of a glass material and wherein the micro-structures are characterized as having been formed integral with the macro-optical characteristic.

11. A light pipe comprising:

an elongated substrate body through which light is able to pass, wherein the elongated substrate body has opposed longitudinal edge margins and opposite end portions, and wherein at least one of said opposite end portions is characterized as being able to receive light;

a plurality of light-reflective facet structures integral with a first of said substrate body longitudinal edge margins; and a plurality of micro-structures which are random in nature and integral with a second of said substrate body longitudinal edge margins, wherein the micro-structures are characterized as being not only able to homogenize light exiting the second substrate body longitudinal end margin but also able to diffuse and shape the light, wherein the micro-structures are further characterized as being able to direct a predetermined distribution of light exiting the second substrate body longitudinal end margin in such a manner as to shape substantially all of a light output of the elongated substrate body into a predetermined direction and distribution pattern, wherein the light-reflective facet structures and the plurality of random micro-structures cooperate thereby to enable the elongated substrate body to produce the light output providing the predetermined direction and distribution pattern of smoothly varying, non-discontinuous light exiting the second substrate body longitudinal end margin; and wherein the random micro structures have a primary axis perpendicular to the mean propagation of light exiting the second substrate body longitudinal end margin.

12. The light pipe according to claim 11, further comprising a light source in contact with the one substrate body end portion.

13. The light pipe according to claim 11, wherein the substrate body is a plastic material and wherein the light-reflective facet structures and the micro-structures are each characterized as having been molded integral with the plastic material.

14. The light pipe according to claim 11, wherein the substrate body is a hardened sol-gel solution and wherein the light-reflective facet structures and the micro-structures are each characterized as having been formed integral with the hardened sol-gel solution.

15. The light pipe according to claim 11, wherein the substrate body and the light-reflective facet structures are of a glass material and wherein the micro-structures are characterized as having been formed integral with the macro-optical characteristic.

* * * * *